US00RE36389E

United States Patent [19]

Al-Jumah et al.

[11] E Patent Number: Re. 36,389

[45] Reissued Date of Patent: Nov. 16, 1999

[54] PROCESS FOR REMOVING CONTAMINANTS FROM POLYOLEFINS

[75] Inventors: Kusay B. Al-Jumah, League City, Tex.; Linwood P. Tenney, Birmingham, Ala.

[73] Assignee: Southern Research Institute, Birmingham, Ala.

[21] Appl. No.: 08/755,787

[22] Filed: Nov. 28, 1995

Related U.S. Patent Documents

Reissue of:

[64] Patent No.: 5,266,124
Issued: Nov. 30, 1993
Appl. No.: 07/799,837
Filed: Nov. 27, 1991

[51] Int. Cl.[6] ..... B08B 3/08

[52] U.S. Cl. ..... 134/42; 134/26; 134/27

[58] Field of Search ..... 8/137.5, 141; 134/42

[56] References Cited

U.S. PATENT DOCUMENTS 2,479,605 8/1949 Denyes ..... 8/137.5
2,832,663 4/1958 Drelich ..... 8/141
3,801,273 4/1974 Mays ..... 8/141

FOREIGN PATENT DOCUMENTS 547773 10/1957 Canada .

OTHER PUBLICATIONS

Chemical Abstract 114(22) 208727(x) 1991.
Chemical Abstract 106(4) 19583(w) 1987.
Chemical Abstract 108(12) 95876(a) 1988.
Chemical Abstract 98(10) 73760(f) 1983.
Chemical Abstract 114(37) 141230(c) 1975.

*Primary Examiner*—Lyle A. Alexander
*Attorney, Agent, or Firm*—Pollock, Vande Sande & Amernick

[57] ABSTRACT

Polyester and cellulosic contaminants are removed from the surfaces of polyolefins by contacting the polyolefins with an aqueous composition of alkali metal hydroxide and/or alkaline earth metal hydroxide; and with an oxidizing agent.

48 Claims, No Drawings

PROCESS FOR REMOVING CONTAMINANTS FROM POLYOLEFINS

Matter enclosed in heavy brackets [ ] appears in the original patent but forms no part of this reissue specification; matter printed in italics indicates the additions made by reissue.

TECHNICAL FIELD

The present invention is concerned with removing certain contaminants from polyolefins and especially concerned with removing polyester and cellulosic contaminants including cotton and paper from the polyolefin. The decontamination process of the present invention can be carried out without employing organic solvents. The process of the present invention is accomplished without degradation of the treated polymer to any significant degree.

BACKGROUND ART

Polyolefins and particularly polymonoolefins such as polypropylene are used as bale wrapper, for example, for baling cotton fibers and polyester fibers. In order to recycle the polyolefins such must be adequately cleaned, which includes removing certain contaminants including polyesters and cellulosic materials such as cotton and paper. Sometimes, low levels of such contaminants may be removed during melt processing by screen packs positioned at the end of an extruder barrel. However, in these bale-wrappers, the presence of both polyester and cellulosic (cotton and paper fibers) creates a unique problem. The cellulosic fibers degrade at temperatures required to melt-process polyesters and at lower temperatures the cellulosic and polyester fibers cause plugging of the filter screens used in extruding the recycled polymer. Mechanical methods that have been attempted have failed to give good separations. In addition, washing with water, with or without detergent, is not a satisfactory approach. Furthermore, difficulties have been encountered in achieving a satisfactory process since the customers for reprocessable, reusable polyolefins have high specifications that are close to those for the original polyolefin material.

SUMMARY OF INVENTION

The present invention is concerned with a process for removing polyester and cellulosic contaminants from polyolefins. The process of the present invention provides for the degradation of polyester and cellulosic contaminants without adversely effecting the properties of the polyolefins. Moreover, the degraded materials are readily removable from the polyolefin. The process of the present invention preferably employs aqueous compositions and does not require the use of organic solvents. The chemicals employed pursuant to the present invention are commercially available, relatively inexpensive, reasonably safe to handle, safe to mix, and water soluble.

More particularly, the process of the present invention comprises contacting a polyolefin contaminated with polyester and cellulosic contaminants with an aqueous composition of an alkali metal hydroxide and/or alkaline earth metal hydroxide; and with an oxidizing agent to thereby degrade the polyester and cellulosic contaminants. The treated polyolefins obtained by the present invention can be melt reprocessed in an economical manner to provide fibers. The recycled fibers exhibit an acceptable level of mechanical properties.

BEST AND VARIOUS MODES FOR CARRYING OUT INVENTION

The contaminated polyolefins treated pursuant to the present invention are not degraded by the chemicals employed to degrade the polyester and cellulosic contaminates. The polyolefins treated pursuant to the present invention include polymers of olefins, and particularly homopolymers of monoolefins such as polyethylene, polypropylene, polyisobutylene, polybuten-1 and polystyrene and preferably polypropylene and copolymers of two or more monoolefins with each other such as copolymers of ethylene with propylene. The polyolefins thus treated may be formed into fibers, films or other molded products. Both amorphous and crystalline polymers can be treated pursuant to the present invention.

In a typical example, polypropylene bale-wrappers are processed for recycling to form recycled polypropylene fibers.

Used polypropylene bale-wrappers for bales of cotton and polyester fibers after use are typically contaminated with the following contaminants:

1 to 2% cotton
1 to 2% polyester
1 to 2% paper (e.g., labels and tags)
<1% metal (e.g., wires, clips, and staples)
<1% wood
<1% dirt
<1% grease and oil Dirt and grease may be removed by conventional washing, and metals are removed by mechanical processes as suggested in the prior art.

Pursuant to the present invention, the polyester fibers, such as polyethylene terephthalates (e.g. dacron), and cellulosic contaminants such as the cotton fibers and paper (e.g.—paper labels) are removed thereby preventing these contaminants from finding their way to the extruder and creating problems. The problem lies with the customer specification that a 250-mesh-filter screen be used in the extrusion process. It is extremely easy for the cellulosic and polyester fibers, if present, to plug such a fine-mesh-filter screen at the polypropylene-processing temperature. Thus, a lot of shut-down time is experienced and the process becomes uneconomical. In addition, small fibers in the final product can adversely effect properties. The paper contaminants in many instances include adhesive coatings such as polyvinylacetate which arc also removed pursuant to the present invention.

It is essential in order to achieve the results desired by the present invention to contact the contaminated polyolefin with both a hydroxide composition and with an oxidizing agent. The hydroxide composition is typically an aqueous solution of an alkali metal hydroxide and/or alkaline earth metal hydroxide. Examples of such are sodium hydroxide, potassium hydroxide, and calcium hydroxide. The preferred hydroxide employed pursuant to the present invention is sodium hydroxide. The aqueous hydroxide solutions typically contain about 5 to about 50% by weight of the hydroxide, preferably about 10 to about 30% by weight of the hydroxide, and most preferably about 20% by weight.

The oxidizing agent is preferably, but not necessarily, employed as an aqueous composition. Suitable oxidants include alkali metal hypochlorites such as sodium hypochlorite, and sodium peroxide. Aqueous compositions of the oxidizing agent typically contain about 0.01% to about 10%, preferably about 0.1 to about 1% by weight and most preferably 0.12 to about 0.15 weight % of the oxidizing agent. The hydroxide and oxidizing agent can be employed as separate compositions and used to treat the polyolefin simultaneously or in any sequence. However, according to preferred aspects of the present invention, both the hydroxide and oxidizing agent are included in the same aqueous composition to treat the polyolefin. For instance, the hydroxide tends to stabilize the oxidizing agents such as the sodium hypochlorite which can be somewhat difficult or dangerous to handle in a composition that becomes acidic. As the sodium hypochlorite is utilized, acid is formed. However, in the presence of the hydroxide, such acid is neutralized by the hydroxide thereby stabilizing the composition. In addition, the hypochlorite tends to react with metals that might be present as contaminants from wires, clips and staples that might have been used. However, the presence of the hydroxide tends to noticeably retard such a reaction thereby leaving the hypochlorite available for degradation of the cellulosic materials.

It is essential pursuant to the present invention, as stated above, that both the hydroxide and oxidizing agent be employed. In particular, the hydroxide tends to degrade the polyester but not the cellulosic materials. An additional advantage is that the caustic removes the surface wax on the cotton fibers and aids in the degradation. On the other hand, the oxidizing agent tends to degrade the cellulosic materials but not the polyester contaminants. In addition, it has been found pursuant to the present invention that neither the hydroxide, oxidizing agent or their combination adversely affect the properties of the polyolefin being treated to any noticeable extent.

Typically, about one-half gallon to about 40 gallons, preferably about 1 to about 20 gallons and most preferably about 2 to about 5 gallons of the aqueous composition of the hydroxide and oxidizing agent are employed per pound of polyolefin being treated. For best results, the polyolefin should be kept submerged in the aqueous composition employed. The polyolefin can be cut into smaller pieces for easier handling.

Typically, the treatment is carried out for about 10 minutes to about 3 hours and more typically about ½ hour to about 2 hours at temperatures of about 85° C. to about 150° C. The temperature employed should be equal to or below the boiling point of the solution. If necessary, the process can be carried out at higher temperatures, but under pressure.

If desired, the metals can be removed prior to or subsequent to the treatment of the present invention by employing means known in the art.

It is further noted, that the hydroxide can be reused several times since only small amounts of the hydroxide are depleted in any particular treatment. On the other hand, the oxidizing agent is rapidly consumed during the treatment.

The contaminants (i.e. cellulosic materials and polyesters) are degraded and removed from the polyolefin as soluble degradation products or fine particles by draining and filtration. In addition, any by-products formed from the hydroxide and oxidizing agents employed pursuant to the present invention are water soluble and accordingly can be diluted, neutralized, or destroyed, for safe disposal thereof, or recovered. In addition, the preferred hydroxide and oxidant, sodium hydroxide and sodium hypochlorite, respectively, are commercially available, relatively inexpensive, reasonably safe to handle, safe to mix and are water soluble.

The following non-limiting examples are presented to further illustrate the present invention.

EXAMPLE 1

Into a glass, 4-liter stirred reaction vessel are added about 50 grams of 1½ inch cut polypropylene fibers contaminated with about gram of cotton, about 1 gram of paper, and about 1 gram of polyester. About 1200 milliliters of an aqueous solution of about 0.12% by weight of sodium hypochlorite and about 20% by weight of sodium hydroxide are added to the glass reaction vessel with stirring to cover the contaminated polypropylene. The temperature is heated to about 95° C. and the reaction is continued for about 2 hours. The polypropylene is separated from the contaminants. All of the cotton, paper, and polyester contaminants are degraded with the polypropylene remaining intact.

EXAMPLE 2

Example 1 is repeated except that the polypropylene is contaminated with about 5 grams of polyester, 1 gram of cotton and 1 gram of paper. The results obtained are similar to those of Example 1 except that a few milligrams of polyester remained undegraded.

EXAMPLE 3

Example 1 is repeated except that the amount of treating solution is about 600 milliliters. The results obtained are not as good as those in Example 1 in that most of the cotton and polyester is not degraded since the volume employed is not sufficient to adequately cover the polypropylene during the process to affect the degradation. Increasing the amount of treating solution to cover the polypropylene such as to about 1200 milliters will result in degrading the remaining cotton and polyester.

EXAMPLE 4

Example 1 is repeated except that the treating composition contains about 0.12% by weight sodium hypochlorite and about 10% by weight sodium hydroxide and the process is carried out for about 2 to 3 hours. In addition, 3 additional grams of polyester are added to the solution 1 gram at a time during the process. All of the cotton, paper and polyester are degraded with the polypropylene remaining intact.

EXAMPLE 5

Into a 2-liter glass reaction vessel are added about 25 grams of 1½ inch cut polypropylene fibers contaminated with about 0.5 grams of cotton fibers, 0.5 grams of paper labels, and about 0.5 grams of polyester fibers. About 600 milliliters of an aqueous solution of about 0.12 weight percent or sodium hypochlorite and about 30 weight percent of sodium hydroxide are added with vigorous agitation. The temperature is increased to about 115° C. and the reaction is carried about for about 25 minutes. The cotton, paper labels and polyester contaminants are all degraded with the polypropylene remaining intact.

EXAMPLE 6

Example 5 is repeated except that the treating composition is an aqueous solution containing about 15% by weight of sodium hydroxide and about 0.12% by weight of sodium hypochlorite. The temperature employed is about 108° C. and the reaction is carried out for about 45 to about 60 minutes at which time all of the cotton, paper labels and polyester is degraded. The polypropylene remains intact.

EXAMPLE 7

Example 5 is repeated except that the treating composition is an aqueous solution containing about 20% by weight of sodium hydroxide and about 0.12% by weight of sodium hypochlorite.nThe temperature employed is about 110° C. and the reaction is carried out for about 35 minutes at which time all of the cotton, paper labels, and polyester contaminants are degraded with the polypropylene remaining intact.

EXAMPLE 8

About 18 pounds of polypropylene contaminated with cotton, paper labels and polyester fibers are introduced into a washer extractor machine available from Pellerin Laundry Machinery Sales Co. Also added are about 61 gallons of a composition containing about 55 gallons of 20% sodium hydroxide and about 1.54 gallons of a 4.73% aqueous solution of sodium hypochlorite with the remainder being water introduced to the washer as steam. The contaminated polypropylene is agitated in the cleaning solution for about 63 minutes at about 95° C. The cleaning solution is then drained off from the polymer and about 61 gallons are collected of which 55 gallons are saved for future use. All of the sodium hypochlorite has been consumed and a minimum amount of cleaning solution remains with the polymer. The polypropylene is then rinsed two times with about 120 gallons of cold water. About 16 pounds of recovered polypropylene is obtained.

EXAMPLE 9

Example 8 is repeated using as the 55 gallon sodium hydroxide portion, the 55 gallon cleaning solution saved from example 8 and 1.54 gallons of 4.73% aqueous NaOCl solutions. The contaminated polypropylene is agitated in the cleaning solution for about 60 minutes at about 95° C. The cleaning solution is then drained from the polypropylene. The polypropylene is rinsed three times with 55 gallon batches of cold water. All of the contaminants are degraded by the treatment.

The polypropylene recovered from this example is combined with the polypropylene recovered from example 8 and then rinsed in about 120 gallons of cold water containing about 1.5 liters of 20% aqueous solution of a laundry sour neutralizer and particularly hydrofluosilicic acid followed by a second rinse in cold water. The sour neutralizer is employed to neutralize the caustic content that might remain on the polypropylene fibers from the treatment. The above neutralization substantially neutralizes the caustic but some still remains; therefore a somewhat higher concentration is to be used to assure complete neutralization.

EXAMPLE 10

Approximately 1 lb of woven and 1 lb of non-woven polypropylene bale wrappers are cleaned in batches of approximately 50.0 g by the chemical cleaning process described in Examples 1 through 9 and then combined. No visible traces of cotton or polyester fibers are present. The 2-lb sample is manually cut into squares about 1"×1". The "squares" are not suitable to feed to an extruder. The mixed samples are passed through a Wiley mill to form a powdery mixture. Dry ice is added, along with the 1" squares of polypropylene, to prevent fusion during the milling. The milled product is baked in a convection oven (air) at 170° C. for approximately 15 min during which time the fluffy, powdery mixture is lightly fused. After vacuum drying for 24 h, the densified product easily feeds to an extruder. Extrusion is performed using a 1"-screw extruder with a 250-mesh-screen pack. The extruded strand is cooled and pelletized. Microscopic examination shows no cotton or polyester fibers on the screen pack. No plugging is experienced. A melt-flow of 5.8 dg/min (ASTM D1238) is exhibited by the cleaned, re-extruded product as compared to the target range of 5–9 dg/min.

EXAMPLE 11

About 49 pounds of polypropylene fibers contaminated with cotton fibers, paper labels, and polyester fibers are introduced into a washer extractor machine available from Pellerin Laundry Machinery Sales Co. Into the machine are introduced about 61 gallons of a treating solution consisting of 55 gallons of the recovered solution from Example 9 and about 1.54 gallons of an aqueous solution of 4.73% sodium hypochlorite with the remainder being water in the form of steam condensate. The temperature of the cleaning solution is maintained at about 95° C. for about one hour. The polypropylene is recovered from the solution and is rinsed three times with 55 gallons of cold water. Since the polypropylene is still contaminated, it is subjected to additional treatment with a cleaning solution of about 61 gallons consisting of 55 gallons of the solution recycled from the above procedure and about 2.0 gallons of the 4.73% aqueous solution of sodium hypochlorite. The mixture is agitated for about one hour at 95° C. The cleaning solution is drained and extracted from the polypropylene. The polypropylene is rinsed once with 55 gallons of cold water containing about 1.5 liters of 20% aqueous solution of laundry sour neutralizer (hydrofluosilicic acid). The polypropylene is then rinsed five more times with 55 gallons of cold water and then rinsed twice with about 55 gallons of hot water. The polypropylene obtained is free from the contaminants and remains intact in the treatment.

EXAMPLE 12

About 1,000 lb of polypropylene fibers contaminated with cotton fibers, paper labels, and polyester fibers, are cleaned in 30-lb batches using a washer/extractor machine available from Pellerin Laundry Machinery Sales Co. Into the machine are added about 56 gal of a treating solution consisting of 49 gal of an aqueous solution of 23% sodium hydroxide and about 3,120 ml of an aqueous solution of 12.5% sodium hypochlorite with the remainder being water in the form of steam condensate. The temperature of the cleaning solution is maintained at approximately 95° C. for one hour. The polypropylene is recovered from the solution and is rinsed two times with 56 gal of hot water and once with 56 gal of cold water.

Cleaned polypropylene obtained by the above process is densified by heating to fusion temperature and then granulation. The densified polypropylene is fed to an extruder at approximately 240° C. (avg barrel temp) and extruded through a screen pack or 30/200/100/30 screens. The melt is extruded to a film, cut to strands, drawn to develop tensile properties, and spooled for subsequent weaving tests N plugging of the screen pack is observed in the runs made. Samples of the drawn fibers showed a tenacity and melt-flow of 5.7 gm/den and 7 to 8 dg/min (ASTM D 1238) as compared to a tenacity of 6 gm/den and a melt-flow index of 3.5 to 4 dg/min, respectively, for the original polypropylene fiber.

What is claimed is:

1. A process for treating polyolefin to remove polyester, and cellulosic contaminants therefrom which comprises contacting polyolefin contaminated with polyester and cellulosic contaminants with an oxidizing agent together with an aqueous composition of a hydroxide selected from the group consisting of alkali metal hydroxide, alkaline earth metal hydroxide and mixtures thereof to thereby cause degradation of polyester and cellulosic contaminants.

2. The process of claim 1 wherein said cellulosic contaminants include cotton.

3. The process of claim 1 wherein said cellulosic contaminants include paper.

4. The process of claim 1 wherein said oxidizing agent is employed as an aqueous composition.

5. The process of claim 1 wherein said oxidizing agent is present in said aqueous composition of a hydroxide.

6. The process of claim 1 wherein said polyolefin is contacted with an aqueous composition containing about 5 to about 50% by weight of said hydroxide and about 0.01% to about 10% by weight of said oxidizing agent.

7. The process of claim 6 wherein said hydroxide consists essentially of sodium hydroxide and said oxidizing agent consists essentially of sodium hypochlorite.

8. The process of claim 6 wherein said aqueous composition contains about 10 to about 30% by weight of said hydroxide and about 0.1 to about 1% by weight of said oxidizing agent.

9. The process of claim 3 wherein said hydroxide consists essentially of sodium hydroxide and said oxidizing agent consists essentially of sodium hypochlorite.

10. The process of claim 6 wherein said aqueous composition contains about 20% by weight of said hydroxide, and about 0.1 to about 1% by weight of said oxidizing agent.

11. The process of claim 10 wherein said hydroxide consists essentially of sodium hydroxide and said oxidizing agent consists essentially of sodium hypochlorite.

12. The process of claim 1 wherein about 1 gallon to about 40 gallons of said aqueous composition per pound of said polyolefin is employed.

13. The process of claim 1 wherein about 1 gallon to about 20 gallons of said aqueous composition per pound of said polyolefin is employed.

14. The process of claim 1 wherein about 2 gallons to about 5 gallons of aqueous composition per pound of said polyolefin is employed.

15. The process of claim 1 which further includes reducing the size of said polyolefin.

16. The process of claim 1 wherein the temperature is about 85° C. to 150° C.

17. The process of claim 1 wherein said polyolefin is selected from the group consisting of polyethylene polypropylene, polyisobutylene, polystyrene polybutene-1 and copolymers of monoolefins with each other.

18. The process of claim 1 which further includes forming fibers from the polyolefin after said contacting.

[19. Fibers obtained by the process of claim 17.]

[20. Recycled polyolefin obtained by the process of claim 1.]

21. The process of claim 1 which further includes separating the treated polyolefin from said aqueous composition and recycling said aqueous composition.

22. The process of claim 1 which further includes forming molded products from the resulting treated polyolefin.

23. The process of claim 1 which further includes forming films from the resulting treated polyolefin.

24. The process of claim 8 wherein said aqueous compositions contains about 0.12 to about 0.15% by weight of said oxidizing agent.

25. The process of claim 1 which comprises treating said polyolefin simultaneously with separate compositions of said oxidizing agent and said hydroxide.

26. The process of claim 1 wherein said contacting is carried out in the absence of an organic solvent.

*27. A process for treating polyolefin to remove cellulosic contaminant therefrom which comprises contacting polyolefin contaminated with cellulosic contaminant with an oxidizing agent together with an aqueous composition of a hydroxide selected from the group consisting of alkali metal hydroxide, alkaline earth metal hydroxide and mixtures thereof to thereby cause degradation of cellulosic contaminant.*

*28. The process of claim 27 wherein said cellulosic contaminant includes cotton.*

*29. The process of claim 27 wherein said cellulosic contaminant includes paper.*

*30. The process of claim 27 wherein said oxidizing agent is employed as an aqueous composition.*

*31. The process of claim 27 wherein said oxidizing agent is present in said aqueous composition of a hydroxide.*

*32. The process of claim 27 wherein said polyolefin is contacted with an aqueous composition containing about 5 to about 50% by weight of said hydroxide and about 0.01% to about 10% by weight of said oxidizing agent.*

*33. The process of claim 32 wherein said hydroxide consists essentially of sodium hydroxide and said oxidizing agent consists essentially of sodium hypochlorite.*

*34. The process of claim 32 wherein said aqueous composition contains about 10 to about 30% by weight of said hydroxide and about 0.1 to about 1% by weight of said oxidizing agent.*

*35. The process of claim 34 wherein said hydroxide consists essentially of sodium hydroxide and said oxidizing agent consists essentially of sodium hypochlorite.*

*36. The process of claim 32 wherein said aqueous composition contains about 20% by weight of said hydroxide, and about 0.1 to about 1% by weight of said oxidizing agent.*

*37. The process of claim 36 wherein said hydroxide consists essentially of sodium hydroxide and said oxidizing agent consists essentially of sodium hypochlorite.*

*38. The process of claim 27 wherein about ½ gallon to about 40 gallons of said aqueous composition per pound of said polyolefin is employed.*

*39. The process of claim 27 wherein about 1 gallon to about 20 gallons of said aqueous composition per pound of said polyolefin is employed.*

*40. The process of claim 27 wherein about 2 gallons to about 5 gallons of aqueous composition per pound of said polyolefin is employed.*

*41. The process of claim 27 wherein the temperature is about 85° C. to 150° C.*

*42. The process of claim 27 wherein said polyolefin is selected from the group consisting of polyethylene, polypropylene, polyisobutylene, polystyrene polybutene-1 and copolymers of monoolefins with each other.*

*43. The process of claim 27 which further includes forming fibers from the polyolefin after said contacting.*

*44. The process of claim 27 which further includes forming molded products from the resulting treated polyolefin.*

*45. The process of claim 27 which further includes forming films from the resulting treated polyolefin.*

*46. The process of claim 27 wherein said aqueous compositions contains about 0.12 to about 0.15% by weight of said oxidizing agent.*

*47. The process of claim 27 which comprises treating said polyolefin simultaneously with separate compositions of said oxidizing agent and said hydroxide.*

*48. The process of claim 27 wherein said contacting is carried out in the absence of an organic solvent.*

*49. The process of claim 27 wherein said polyolefin is polypropylene.*

*50. The process of claim 27 wherein said polyolefin is polyethylene.*

* * * * *